US010670022B2

(12) United States Patent
Roy

(10) Patent No.: US 10,670,022 B2
(45) Date of Patent: Jun. 2, 2020

(54) SOLAR POWERED PUMPING SYSTEM

(71) Applicant: Sanjay K Roy, Palmetto Bay, FL (US)

(72) Inventor: Sanjay K Roy, Palmetto Bay, FL (US)

(*) Notice: Subject to any disclaimer, the term of this patent is extended or adjusted under 35 U.S.C. 154(b) by 239 days.

(21) Appl. No.: 15/586,782

(22) Filed: May 4, 2017

(65) Prior Publication Data
US 2017/0335851 A1 Nov. 23, 2017

Related U.S. Application Data

(60) Provisional application No. 62/337,473, filed on May 17, 2016.

(51) Int. Cl.
*F04D 15/00* (2006.01)
*F04B 17/00* (2006.01)
*F04D 13/06* (2006.01)

(52) U.S. Cl.
CPC ........ *F04D 15/0066* (2013.01); *F04B 17/006* (2013.01); *F04D 13/06* (2013.01)

(58) Field of Classification Search
CPC .... F04B 17/006; F04B 49/065; F04D 13/068; F04D 15/0066; H02M 7/521; H02M 7/53; H02M 7/537
See application file for complete search history.

(56) References Cited

U.S. PATENT DOCUMENTS

| 4,303,833 | A | 12/1981 | Eckel et al. |
| 4,586,879 | A | 5/1986 | Slater |
| 4,620,140 | A | 10/1986 | Chonan |
| 4,744,334 | A | 5/1988 | McAnally |
| 4,999,560 | A | 3/1991 | Morishima et al. |
| 5,336,061 | A | 8/1994 | Armstrong |
| 5,560,218 | A | 10/1996 | Jang |
| 6,189,811 | B1 | 2/2001 | Rudy |
| 6,469,487 | B2 | 10/2002 | Ewert et al. |
| 6,590,793 | B1 | 7/2003 | Nagao et al. |
| 7,126,294 | B2 | 10/2006 | Minami et al. |
| 8,072,187 | B2 | 12/2011 | Wu et al. |
| 8,373,303 | B1 | 2/2013 | Daniels et al. |
| 8,493,759 | B2 | 7/2013 | Viitanen et al. |
| 8,545,194 | B2 | 10/2013 | Irving et al. |
| 9,419,556 | B2 | 8/2016 | Shenoy et al. |
| 2007/0035975 | A1* | 2/2007 | Dickerson ................ H02J 7/35 363/131 |
| 2008/0286134 | A1* | 11/2008 | Regalado ................ F04D 13/10 417/423.3 |
| 2014/0306544 | A1* | 10/2014 | Hantschel ............... H02J 3/383 307/82 |

* cited by examiner

*Primary Examiner* — Kenneth J Hansen

(57) ABSTRACT

A solar powered pump that maximizes available energy usage under variable insolation conditions is disclosed. It also permits the integration of parameters such as minimum flow control, set point operation, etc., without the use of additional sensors, thereby reducing the overall cost of the system. It comprises a solar array or other intermittent power source, a motor drive system that provides the power to an electric motor through a variable output power module and a flow loop comprising a pump coupled to the motor, valves and one or more sensors for flow control. The variable output power module uses data from at least one of the sensors to maximize power utilization by maximizing the flow rate in the fluid circuit/loop.

17 Claims, 2 Drawing Sheets a. Block diagram of overall system b. Block diagram of dc to variable-frequency converter (with comparator/controller)

Schematic diagram of first preferred embodiment utilizing AC motor

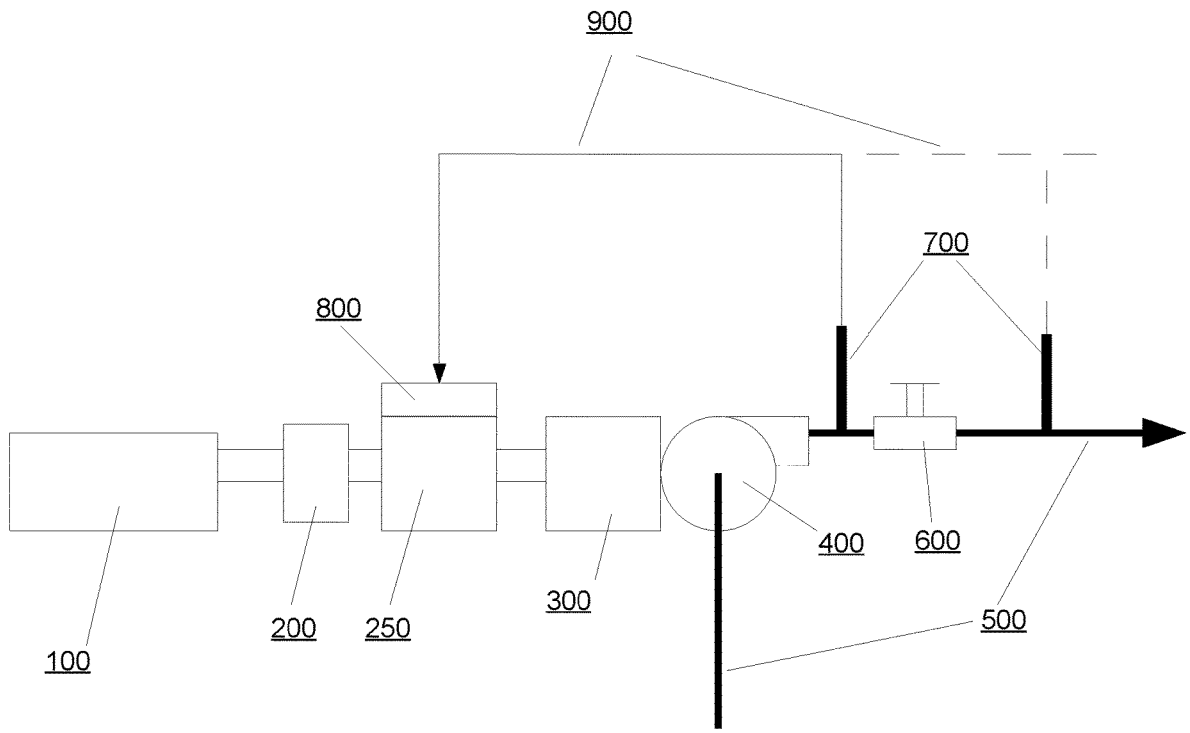
a. Block diagram of overall system
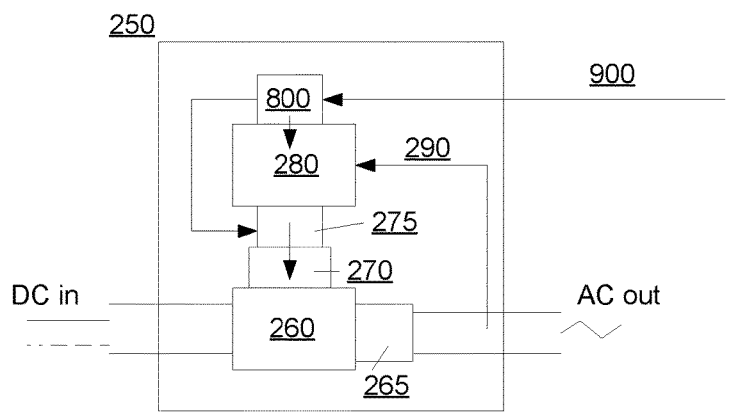
b. Block diagram of dc to variable-frequency converter (with comparator/controller)
Fig. 1 Schematic diagram of first preferred embodiment utilizing AC motor

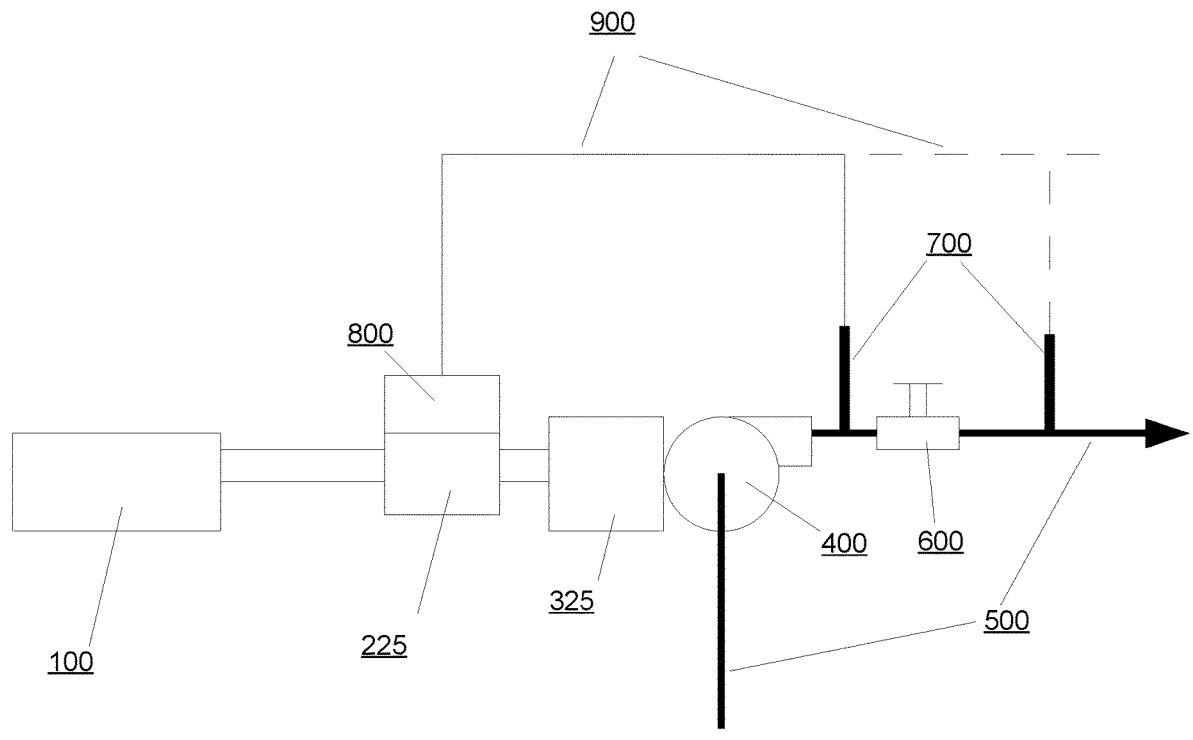
a. Block diagram of overall system
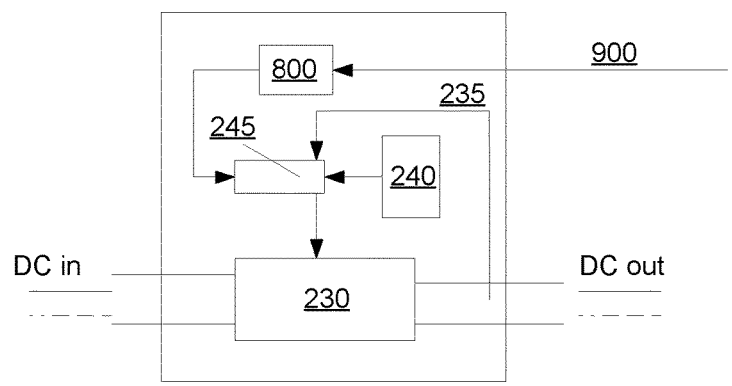
b. Block diagram of variable output dc-dc converter (with comparator/controller)
Fig. 2 Schematic diagram of preferred embodiment utilizing DC motor

SOLAR POWERED PUMPING SYSTEM

RELATED APPLICATION

This application claims the benefit of U.S. Provisional Appl. Ser. No. 62/337,473 filed on May 17, 2016—the contents of which are incorporated by reference herein.

FIELD OF INVENTION

This disclosure is related to solar and other renewable energy powered pumps and similar systems used for agricultural and related applications in remote and/or rural settings.

BACKGROUND OF THE INVENTION

Electric motor powered pumps are widely used to transport water from rivers, irrigation canals, wells and other sources for agricultural, drinking water and other applications. In urban areas and regions where electric utility power is readily available, this power is used to power the motor/pump in a controlled and dependable manner. In remote areas where electrical power may not be as readily available, internal combustion engine powered systems are used as a more expensive alternative.

With increasing costs of fossil fuels and environmental issues, solar power has become more popular in recent years. This has been aided by significant cost reductions due to the development of low cost technologies and subsidies provided by governments worldwide. As a result, solar powered pumping systems are often more cost-effective than engine powered systems in many remote and rural areas.

An important issue with solar energy powered pumping systems is the variable nature of the power source. In conventionally powered pumps (i.e. utility or engine powered systems), this is not a factor since electric power is available on demand as long as the electric current limits and engine sizing have been done properly. In these systems, the pumping rate is readily controlled by throttling the flow (i.e. via valves, etc.), or by motor (or engine) speed control which can be accomplished by varying the input voltage (for dc motors) or the frequency (for ac motors). In contrast, practical implementation of solar powered systems is much more difficult due to changing outdoor conditions. Not only does this result in variable power availability, but the voltage output of PV systems also varies with the incident solar intensity. Thus, a solar powered pumping system must necessarily be more complex to ensure that the varying available power is properly used.

DESCRIPTION OF THE PRIOR ART

The simplest design of a solar powered pumping system is to connect the output of the solar PV array(s) to a dc motor driving the pump. In this approach, the motor and pump are operational whenever the voltage and current/power output of the solar panels are sufficiently high. Though this method is very simple, solar power usage is very inefficient. This is due to the fact that the motor/pump may not operate even when adequate power is available since the output voltage of the solar panels may become too low when the incident solar radiation falls below a certain value. The easiest option then is to use a larger solar PV array, but this results in higher costs (without any improvement in relative energy use).

In order to overcome the above problem, a common approach is to connect the output of the PV array to a dc-dc converter that provides a constant voltage output. This is then directly supplied to a dc motor/pump which can be operated as long as the PV system provides enough power (less the converter losses) at the rated voltage. Alternatively, the dc voltage is converted to a constant ac voltage using an inverter, and the pump is driven by an ac motor instead. The choice of ac or dc motor is typically determined by the cost, i.e. whether the cost of the inverter is less than the price differential between ac and dc motors. In either case, the system then operates like a conventionally powered pump with further system control being done via valves, etc. as required.

Regardless of whether an ac- or a dc-motor is used, it is important to note that the entire output of the solar PV system is used only under limited circumstances due to the constraints imposed by a fixed operating voltage (and frequency for the ac powered system). When the power available is more than that required to operate the pump, excess power is wasted as power drawn by the motor is determined by the preset converter voltage, and the solar panel operates below its maximum power point. On the other hand, when the available power is below the required power corresponding to the preset voltage, the converter voltage output droops below the preset value, and the operating point may become unpredictable. Under these conditions, system shutdown is often the preferred option.

To increase the the solar power utilization, a "maximum power point tracking" (MPPT) system is often used together with the basic system above. In this approach, an electronic circuitry is used to identify the maximum solar PV power available at any time by measuring the solar array output voltage (and current in many cases). Excess power, beyond that used by the pumping system, is then provided through a separate output to a secondary load, e.g. a battery charging system. The battery itself is typically not simultaneously used as a supplementary power source for the pump since this increases system complexity and cost excessively.

In all the above designs, system startup and shutdown control circuitry are also required with solar powered systems. These circuits ensure that the motor is switched off (i.e. disconnected from the power source) when the power available is so low that it stalls, and is turned on when adequate power is available. This is usually accomplished based on a combination of preset input voltage limits and/or motor speed measurements. This aspect of the control system is then added to a standard fluid control system based on flow rate and/or pressure or pressure drop measurements in the flow loop that enable control operations, such as switching off the motor/pump when the main valves are closed, or when a storage tank is full, etc. Overall system costs include all these additional costs.

The above summary clearly shows some of the disadvantages/limitations of current solar powered pumping systems:

a. A simple system is possible only if very inefficient solar energy utilization is acceptable. Thus, this approach is used only in rare, cost-constrained, small/low power units.

b. In order to improve solar energy utilization, voltage conversion is essential regardless of whether the system incorporates a dc motor/pump or an ac motor/pump. In this typical approach, the maximum available power is not used except under select conditions.

c. If all of the available power is to be used, the system in (b) above must be augmented by MPPT circuitry. This leads to high costs, particularly if there are no secondary applications for the excess power, and it is used as supplementary power for the pump.

d. The overall pumping system includes not only the solar power source and its related electronics, but also the pump/motor drive, flow control system, etc. These subsystems (e.g, fluid controls, motor controls) are typically added on separately to current solar pumps and determine the final costs (which may not be optimal).

Based on the above, it is clear that there is a need for a solar energy powered pumping system that (a) can use the maximum available solar power at any time, (b) incorporates well integrated sub-systems and (c) is of low cost.

SUMMARY OF THE INVENTION

This invention comprises a low-cost solar powered pumping system that maximizes solar energy utilization under variable insolation conditions while overcoming the above constraints. It incorporates the following:

a. A power source comprising a solar array generating/supplying varying levels of electrical power depending on the solar insolation.

b. A motor drive system that takes the power generated by the source as an input and provides it to an electric motor through a variable output power module that uses data from the flow loop as the control variable to manage the power usage.

c. A flow loop comprising a pump coupled to the motor, valves, sensors for flow control (i.e. flow rate(s) and/or pressure(s) and/or pressure drop(s)), etc. with data from at least one of the sensors being provided to the variable output power module.

Maximum power utilization can be obtained in the present invention by maximizing the flow rate in the fluid circuit/loop. This is done by using the variable output power module, data from flow rate sensor(s) in the flow loop and an electronic controller/comparator using a "perturb-and-observe" (P & O) or related algorithm as follows:

a. The overall system is started up at a predetermined motor starting speed based on a pre-programmed motor power input. Though this startup can be done at the default system/operating condition based on the available power, a low speed startup is preferred since it minimizes the possibility of stall and other adverse conditions.

b. The output of the variable output power module is then adjusted incrementally (to change the motor speed in a pre-selected "up" or "down" direction) and the electronic comparator is used to compare two (or a small number of) consecutive measurements from the flow control system.

c. The output controller is adjusted in the same direction as the previous increment as long as the flow rate is found to increase. When the flow rate is found to decrease, the incremental adjustment is done in the reverse direction. This procedure is continuously repeated to ensure that maximum flow conditions are maintained.

Since the pumping power corresponds to the product of the flow rate and the pressure drop in the fluid loop, and the pressure drop increases with the flow rate, maximum flow conditions will automatically correspond to maximum power use conditions in a typical situation. Thus, a separate MPPT circuit is not required.

It is important to note the differences between the present invention and current approaches and its many advantages— a. In this invention, maximum power utilization is determined from the demand-side, i.e. from the flow loop, and not from the supply side, i.e. not the voltage/current/power supplied by solar panels (or supplied to the motor). Thus, maximum power usage is independent of the efficiencies of prior stages. In contrast, existing systems employ supply-side MPPT algorithms. When supply-side MPPT is used, low power conditioning, motor or pump efficiencies may result in high losses at these early stages resulting in less useful pumping power.

b. By using flow loop data together with a variable power output module, power demand by the flow loop can be directly matched with the power available. Thus, the pump can be used as long as the power available from the solar PV array (less the losses in the various stages) is adequate to pump the fluid within the flow circuit/loop. In contrast, the preset voltage in currently used systems limits the operating range of the pump/motor to a much smaller fixed voltage-variable current regime.

c. Parameters in the flow loop are used to enable maximum power usage. Since these are already measured on a continuous basis in typical flow control systems, additional sensors and solar array-side MPPT related circuitry are not required. Instead, startup and shutdown operations can be readily integrated with the maximum flow control system. This will result in lower costs and increased reliability.

d. Similar electronic circuitry can be designed/utilized for voltage conversion (dc-dc, dc-ac converters) and speed control (variable dc voltage, variable ac frequency) which are key aspects of the variable power module. The cost of the overall motor drive system can therefore be minimized by integrating the variable power module with the voltage conversion system(s) for both ac and dc motors. This leads to lower costs and higher reliability, and ac drives will become viable in many more applications.

e) There is better control and power usage over the long term as gradual changes in the flow loop itself (due to fouling, corrosion, pump and system wear and tear, etc) are automatically accounted for over time.

f) In an extreme case of efficiency mismatch between the source and the flow loop (e.g. when there is a sharp drop-off in pump or converter efficiency), maximum power usage in the flow loop may not correspond to the maximum power available, i.e. system operation will not correspond to conventional MPPT operation. Under these conditions, the additional power available may be used for a secondary application(s) if so desired.

g) System operation at a fixed flow rate (or other condition, e.g. maximum allowable pressure in the flow loop) is easily accomplished since there is a single integrated control system driven by the flow sensors themselves. In this case also, the additional power available may be used for a secondary application(s) thus making the overall system more versatile.

BRIEF DESCRIPTION OF THE DRAWINGS

FIG. 1 is a schematic diagram of the first preferred embodiment of the invention incorporating an ac motor.

FIG. 2 is a schematic diagram of the second preferred embodiment of the invention incorporating a dc motor.

DETAILED DESCRIPTION

The invention as summarized can be implemented using either ac (1- or 3-phase induction) or dc motors. The lower cost and longer life of an ac motor based system makes it preferable as long the cost (and complexity) of the power conversion electronics associated with the ac drive are not excessive.

By using an integrated approach to the power conversion and control system, this incremental cost can be minimized, and both approaches will be practical.

First Preferred Embodiment

FIG. 1 shows a schematic diagram of a first preferred embodiment of the overall system. It is based on an ac drive and comprises of the following:

i) A solar photovoltaic (PV) panel(s)/array (100) that is the primary power source.

ii) A flow circuit/loop (500) incorporating a fluid prime mover ((400), i.e. a pump for a liquid, though it may be a compressor, blower or fan for a gas) for driving a fluid (typically water, but it may be any liquid or gas), one or more sensors (700) that provide flow rate data (directly or indirectly), as well as other fittings, valves (600), etc. that are typical of standard flow systems. Note that only a small portion of the flow circuit/loop (500) is shown in the figure: it may be an open circuit for transferring fluid from one location to another or may be a closed loop for circulating a fluid within.

iii) A fixed output dc-dc converter (200) that takes solar power at varying voltages as the input and provides output power at a fixed dc voltage suitable for driving a motor.

iv) A variable frequency dc-ac converter (250) that converts the dc voltage output from the dc-dc converter to an ac voltage whose frequency can be adjusted based on a control parameter.

v) An ac motor (300) that receives power from the dc-ac converter (200) and drives the fluid in the flow circuit/loop (500) using the fluid prime mover (400).

vi) A comparator/control module (800, shown here as part of the dc-ac converter (250)) that implements a perturb-and-observe algorithm to control the frequency of the output of the dc-ac converter (250) by using flow data from sensor(s) (700) in the flow circuit/loop.

vii) A communication link (900) between the sensor(s) (700) and the comparator/control module (800) that allows them to communicate as required per (vi) above. This may be done via wired, wireless, optical or other means.

The sensor(s) (700) used for the control function are particularly important in ensuring maximum power usage. In this invention, these are selected by noting that the pumping power ultimately determines the power demand from the source (the solar array (100)). This pumping power is related to the product of the flow rate and the pressure drop between the pump outlet and the pump inlet. However, since the flow rate is determined by the pumping pressure, maximum power usage can be attained by maximizing this pressure or the flow rate. Thus the comparator can be designed to work on the output one or more of the following sensor/transducer types:

- a flow transducer/sensor that directly measures the flow rate
- a pressure transducer(s)/sensor(s) that measures a differential pressure that can be related to the flow rate
- a pressure transducer/sensor that measures the maximum system pressure at the pump outlet The configuration of the variable frequency dc-ac converter (250) is also important in ensuring that it meets the goals of the invention (low cost, high reliability/life and good efficiency). Dc-ac converters or inverters are of three types, square wave, modified sine wave and pure sine wave. The first two are less expensive but provide ac power with high frequency harmonics that cannot be adequately filtered out over the entire speed range. These harmonics have an adverse effects on motor life (as well as other electronics in the vicinity), and a pure sine-wave inverter is therefore used in this preferred embodiment.

FIG. 1b shows a overview/block diagram of the variable frequency dc-ac converter (250) incorporating a pure sine-wave inverter architecture. These inverters comprise high frequency switching networks (260) that change a constant voltage dc input to a time-varying output by controlling the timing and polarity via multiple switching processes. The switching networks are controlled via driver(s) (270) using output signals from pulse-wave-modulation (PWM) circuits (275). The output of the PWM modules are obtained by combining a reference sinusoidal signal (i.e. the modulating waveform at the required frequency, e.g. 60 Hz) together with one or more high frequency carrier waves (typically triangular pulses) which are generated in a separate block(s) (280). Suitable low pass filters (265) are used to remove unwanted high frequency harmonics from the output of the switching networks so that it corresponds closely to a pure-sine wave.

All inverters incorporate a feedback loop (290) that utilize the reference/carrier wave generating circuits (280) to ensure that the frequency remains stable regardless of load (and supply) changes. This is done by comparing the output frequency with the frequency of the modulating signal and correcting for any error via suitable compensating signals sent to the PWM modules. In the preferred embodiment, an important modification is made to this feedback-compensation loop, i.e. it is coupled with the reference/carrier signals and the comparator/control module (800) so that the frequency can be adjusted as required during operation (instead of it being maintained constant).

By combining frequency (i.e. speed) control with the dc-ac conversion, a separate variable speed ac drive is not required in the preferred embodiment. Such drives are a significant cost adder so that ac motor powered systems are often more expensive than dc motor driven systems even though dc motors typically cost much more than comparable ac motors. This use of a direct dc-ac variable frequency (1 phase or 3 phase) inverter is a particularly important feature of this preferred embodiment. An additional advantage of this approach is that the maximum allowable frequency for the reference signal (and the corresponding carrier wave) can be preset to match the maximum allowable speed for a specific design in order to provide a hard operating limit for the motor/pump if necessary.

It is also important to note that (iii) and (iv) above, i.e. the dc-dc converter (200) and dc-ac converter (250) can be interchanged in an equivalent design. The alternative would be to implement the dc-ac conversion in the first step after which the ac voltage is changed (using a transformer for example) so that it is suitable for use with an ac motor. Cost and conversion efficiency will determine the preferred approach.

Based on the above, the overall system functions using the "perturb and observe algorithm" to adjust the frequency of the output voltage of the dc-ac converter (and thereby speed of the ac motor) to maximize the flow rate, i.e. the sensor output. This is done as follows (note that there are many variations of the P&O algorithm—this a typical approach that may be replaced by other equivalent implementations):

a. Power from a solar PV array is supplied via the dc-dc converter to the dc-ac inverter. Power from the inverter is supplied to the ac-motor/pump with the initial predetermined frequency (corresponding to a low speed in the preferred embodiment).

b. Sensor data related to flow (i.e. flow rate or pressure or differential pressure as described above) is supplied by the sensor(s), after suitable processing/conditioning (e.g. averaging, noise-filtering) if necessary, to the comparator/controller module.

c) The converter output frequency is adjusted by an small incremental value (which will typically be a preset amount) in a pre-selected "positive" direction.

d) Sensor data is once again sent to an electronic comparator/controller module and compared with the previously sent value.

e) Two possible outcomes are possible here:
  (i) If the previously sent value is less than (or "equal to") the flow rate in (d), step (c) is repeated.
  (ii) If the previously sent value is greater than the flow rate in (d), this shows a lower power usage. In this case, step (c) is repeated, but in the reverse direction by a small incremental value, and this reverse direction is now set as the "positive" direction.

Steps (c-e) are now repeated on a continuous basis at preset time intervals with the latest value being replaced as the previous value at the end of every step. This will ensure that operating condition corresponds to the maximum flow and maximum power point.

It is important to note that the same algorithm with minor changes can be used if the goal is to use a flow related set-point (e.g. fixed flow rate, pressure, etc.) instead of the maximum flow condition. In this case, the set-point is used as a constraint for the maximum, and the set point (instead of previous value) is compared to measured value in step (d) above.

Second Preferred Embodiment

FIG. 2 shows a schematic diagram of a second preferred embodiment of the overall system. It is similar to the first preferred embodiment but is based on a dc drive, and comprises of the following:

i) A solar photovoltaic (PV) panel(s)/array (100) that is the primary power source.

ii) A flow circuit/loop (500) incorporating a fluid prime mover ((400), i.e. a pump for a liquid, though it may be a compressor, blower or fan for a gas) for driving a fluid (typically water, but it may be any liquid or gas), one or more sensors (700) that provide flow rate data (directly or indirectly), as well as other fittings, valves (600), etc. that are typical of standard flow systems. Note that only a small portion of the flow circuit/loop (500) is shown in the figure: it may be an open circuit for transferring fluid from one location to another or may be a closed loop for circulating a fluid within.

iii) A variable output dc-dc converter (225) that takes solar power as the input and provides output power over a wide voltage range suitable for driving a dc motor.

iv) A dc motor (325) that receives power from the dc-dc converter (225) and drives the fluid in the flow circuit/loop (500) using the fluid prime mover (400).

v) A comparator/control module (800) that implements a perturb-and-observe algorithm to control the output voltage of the variable output dc-dc converter (225) by using flow data from sensor(s) (700) in the flow circuit/loop.

vi) A communication link (900) between the sensor(s) (700) and the comparator/control module (800) that allows them to communicate as required per (vi) above. This may be done via wired, wireless, optical or other means.

The sensor(s) (700) used for the control function are similar to those used in the first preferred embodiment. However, the variable output dc-dc converter is different so that it is suited to dc-dc converter circuit designs. The focus here is on the a specific aspect of the dc-dc converter, viz. a feedback loop that is used to ensure that the converter provides a stable output voltage regardless of load (and supply) changes. In conventional designs, this loop is used to compare the output voltage of the converter with a reference (constant) voltage source, so that any deviations between the two can be corrected.

In the preferred embodiment (FIG. 2b), an important modification is made to the feedback loop (235) used with the dc-dc converter block (230). In this case, the loop is coupled with (or replaced by) the comparator/control module (800) so that the reference voltage (240) can be adjusted as required during operation instead of it being maintained constant. More specifically, the output of the sensor is used together with a voltage divider/compensation circuit (245) to change the reference voltage, and thereby the output voltage and motor speed as required. The upper limit of the reference voltage can be set such that it corresponds to the upper operating limit for the pump, so that the overall design is simplified considerably. Thus, a separate variable speed dc drive is not required and system costs are minimized.

As in the first embodiment, the overall system functions using the "perturb and observe algorithm" to adjust the output voltage of the dc-dc converter (i.e. the input voltage and speed of the dc motor) to maximize the flow rate, i.e. the sensor output. This is done as follows:

a. Power from a solar PV array is supplied to the dc-dc converter. Power from the dc-dc converter is supplied to the dc-motor/pump with the initial output voltage.

b. Sensor data related to flow (i.e. flow rate or pressure or differential pressure as described above), after suitable processing/conditioning if necessary, is supplied by the sensor(s) to the comparator/controller module.

c) The converter output is adjusted by an small incremental value (which will typically be a preset amount) in a pre-selected "positive" direction.

d) Sensor data is once again sent to an electronic comparator/controller module and compared with the previously sent value.

e) Two possible outcomes are possible here:
  (i) If the flow rate in (d) is greater than (or "equal to") the previously sent value, step (c) is repeated.
  (ii) If the flow rate in (d) is less than the previously sent value, this shows a lower power usage. In this case, step (c) is repeated, but in the reverse direction by a small incremental value, and this reverse direction is now set as the "positive" direction.

Steps (c-e) are now repeated on a continuous basis at preset time intervals. This will ensure that operating condition corresponds to the maximum flow and maximum power point. As in the first embodiment, note that other similar/equivalent P&O algorithms and flow related set-points can be used.

It is important to note that in both embodiments above, the controller can readily have additional functions for special operating conditions. For example, 1. When a control valve is closed (e.g. if a tank is full), the flow rate (or differential pressure in the flow line) will become zero/very small. The comparator/controller can have the additional function to shut down the pump below a (preset) low flow rate/differential pressure. Alternatively, since the pressure in the flow circuit will become high (beyond the value for normal operating conditions), the comparator/controller can have the additional function that shuts down the pump above a (preset) high pressure.

2. If there is a flow line break leading to a major leak, the flow rate may become very high (higher than values under normal operating conditions). For this case, the controller can have an additional function set to shut of the motor/pump above a (preset) high flow rate.

A number of other variations are to above embodiments are also possible. Some examples are as follows:

a. Instead of solar power, the power source can be another similar source where the available power varies with time in an unpredictable (or partially predictable, e.g. a renewable source such as wind, etc. without adequate storage) manner. At the same time, the prime mover can be a compressor (for a refrigerant or other gas) used in a flow loop of a cooling, thermal energy storage or other system (e.g. refrigeration, air conditioning, etc.) instead of a pump in a solar pumping system.

b. In an ac motor/pump based system (the first preferred embodiment), the fixed voltage output dc-dc converter and the variable frequency dc-ac converter may be combined into a single dc-ac converter module together with the comparator/controller. Alternatively, the different subsystems (dc-dc conversion, dc-ac conversion, variable frequency ac-ac conversion) may be combined/split in different modules if that is advantageous from a design, cost and use perspective.

c. A similar approach to (b) is also be possible for the second preferred embodiment. The single variable output dc-dc converter can be replaced by two separate modules—a fixed output dc-dc converter (as in present systems) coupled with a secondary variable output dc-dc converter that works on the fixed output of the first. This is equivalent to the preferred embodiment, but may make for a more manufacturable and modular package. The comparator/controller may also be split from the variable output module.

d. Instead of using data from a single measurement for comparison at every stage, data from multiple measurements can be used after suitable averaging using an appropriate signal conditioning circuit. This can help achieve more smooth system operation.

e. The incremental adjustment can be time-varying. Various options are possible here, e.g. larger increments can be used when the relative change in flow rate is small, whereas smaller increments can be used when the measured change in flow rate is high. This should also lead to quicker and smoother system operations.

f. The incremental adjustments can be done at varying time intervals instead of fixed time intervals. For example, when the relative change in flow rate is high, the time interval can be small; in contrast, when the relative change in flow is small, the time interval can be high. This too should result in more smooth operation as above.

g. Periodic and/or flow dependent re-initializations to preset controller settings may be incorporated in the control algorithm to ensure that the system does not get constrained at a local minima condition. This can help ensure that maximum flow (and power usage) conditions are achieved even under non-design conditions, e.g. when a portion of the array becomes shaded.

h. Other parameters can also be used to supplement/complement the flow data, e.g the voltage input to the motor, motor temperature, etc. may be used as additional control parameters. This may be particularly useful as a secondary or backup control mode (e.g. in case of primary sensor failure, motor protection, etc.)—note that voltage (or motor speed) control by itself, will not lead to maximum power usage conditions under all circumstances, and would not meet the goals of this invention.

i. Finally, it is important to reiterate that there are a number of variations to the P&O algorithm that has been described in the previous sections. These may be based on differences between consecutive measurements (the difference between consecutive measurements will change from a positive to a negative value or vice-versa as one crosses the maxima—the sign change (+ve/−ve) can be used for control), the slope of the flow rate v/s converter output function (which will also change signs across a maxima), etc. Similarly, when a set point or constraint condition (fixed flow, maximum allowable pressure, etc.) is imposed, an equivalent method would be to minimize the difference between the output and the constraint. Thus, any of the alternative implementations of the P&O algorithms can be used in this invention as equivalent embodiments.

Details of the power source, the motor drive system/variable output power module, the sensor/transducer data collection, transmission and conditioning hardware and software, the control logic, flow loop architecture, etc. have not been described above since many variations are feasible based on prior art. Thus, while the invention has been described and disclosed in various terms or certain embodiments, the scope of the invention is not intended to be, nor should it be deemed to be limited thereby, and such other modifications or embodiments as may be suggested by the teachings herein are particularly reserved especially as they fall within the breadth and scope of the claims here appended.

What is claimed is:

1. A pumping system utilizing a direct current (dc) solar power source for pumping a fluid in a flow circuit comprising, an ac motor coupled to a fluid prime mover to pump the fluid through said flow circuit, a dc-dc voltage converter that receives power from said power source and provides output power at a constant voltage, a dc to variable-frequency-ac voltage converter that receives power from said dc-dc converter and supplies it to said ac motor with an output voltage frequency, at least one sensor in said fluid circuit configured to obtain a measurement, wherein said sensor is one of a flow sensor for measuring a magnitude of a rate of flow in said flow circuit, a pressure sensor for measuring a magnitude of the pressure corresponding to said rate of flow, or a differential pressure sensor for measuring a magnitude of the differential pressure corresponding to said rate of flow, wherein said dc to variable-frequency-ac voltage converter comprises a controller and circuitry for providing an output voltage frequency, wherein said controller is in communication with said sensor, and wherein said controller is configured to maximize corresponding pumping power utilization by maximizing the rate of flow of said fluid through said flow circuit by utilizing the measurement from said sensor and implementing a perturb-and-observe control algorithm adapted to iteratively set a predetermined value of the output voltage frequency of said dc-variable frequency-ac voltage converter to change motor speed while monitoring the magnitude of the measurement from said sensor and then incrementally adjusting the predetermined value of the output voltage frequency while comparing the measurement from the sensor in order to maximize the rate of flow and the corresponding pumping power utilization.

2. The pumping system in claim 1, wherein the dc to variable-frequency-ac converter comprises multiple modules.

3. The pumping system in claim 1, wherein the dc-dc converter and dc to variable-frequency-ac converter are combined into a single module.

4. The pumping system in claim 1, wherein the sensor and the controller communicate using one of electronic, wireless or optical means.

5. The pumping system in claim 1, wherein said fluid prime mover is one of a pump, a compressor, a blower or a fan.

6. The pumping system in claim 1, wherein said magnitude of the measurement from said sensor and the predetermined value of the output voltage frequency of the perturb-and-control algorithm are constrained by predetermined set points.

7. A pumping system utilizing a direct current (dc) solar power source for pumping a fluid in a flow circuit comprising,
a dc motor coupled to a fluid prime mover to pump the fluid through said flow circuit,
a variable output voltage dc-dc converter that receives power from said power source and supplies output power to said dc motor at an output voltage,
at least one sensor in said fluid circuit configured to obtain a measurement, wherein said sensor is one of a flow sensor for measuring a magnitude of a rate of flow in said flow circuit, a pressure sensor for measuring a magnitude of the pressure corresponding to said rate of flow, or a differential pressure sensor for measuring a magnitude of the differential pressure corresponding to said rate of flow,
wherein said variable output voltage dc-dc converter comprises a controller and a reference voltage and circuitry for providing an output adjustable dc voltage, wherein said controller is in communication with said sensor, and wherein said controller is configured to maximizes corresponding pumping power utilization by maximizing the flow rate of said fluid through said flow circuit by utilizing a voltage divider circuit with said reference voltage and the measurement from said sensor, and implementing a perturb-and-observe control algorithm adapted to iteratively set a predetermined value of the output adjustable dc voltage of said dc-dc converter to change motor speed while monitoring the magnitude of the measurement made from said sensor and then incrementally adjusting the predetermined value of the output adjustable dc voltage while comparing the measurement from the sensor in order to maximize the rate of flow and the corresponding pumping power utilization.

8. The pumping system in claim 7, wherein the variable output voltage dc-dc converter comprises multiple modules.

9. The pumping system in claim 7, wherein the sensor and the comparator/controller communicate using one of electronic, wireless or optical means.

10. The pumping system in claim 7, wherein said fluid prime mover is one of a pump, a compressor, a blower or a fan.

11. The pumping system in claim 7, wherein said magnitude of the measurement from said sensor and the predetermined value of the output voltage of the perturb-and-control algorithm is are constrained by predetermined set points.

12. A variable-frequency-ac voltage drive for use with an ac electric motor in a fluid flow circuit that maximizes power utilization from an intermittent power source,
said flow circuit comprising at least one sensor configured to obtain a measurement and a fluid prime mover driven by said ac electric motor,
wherein said sensor is one of a flow sensor for measuring a magnitude of a rate of flow in said flow circuit, a pressure sensor for measuring a magnitude of the pressure corresponding to said rate of flow, or a differential pressure sensor for measuring a magnitude of the differential pressure corresponding to said rate of flow,
said variable-frequency-ac voltage drive comprising a controller and circuitry for receiving power from said intermittent power source and providing an output voltage frequency, wherein said controller is in communication with said sensor, and wherein said controller is configured to maximizes corresponding pumping power utilization from said intermittent power source by maximizing the flow rate of said fluid through said flow circuit by utilizing the measurement from said sensor and implementing a perturb-and-observe control algorithm adapted to iteratively set a predetermined value of the output voltage frequency of said variable-frequency-ac voltage drive to change the speed of said ac electric motor while monitoring the magnitude of the measurement from said sensor and then incrementally adjusting the predetermined value of the output voltage frequency while comparing the measurement from the sensor in order to maximize the rate of flow and the corresponding pumping power utilization.

13. The variable-frequency-ac voltage drive in claim 12, wherein the sensor and the controller communicate using one of electronic, wireless or optical means.

14. The variable-frequency-ac voltage drive in claim 12, wherein said magnitude of the measurement from said sensor and the predetermined value of the output voltage frequency of the perturb-and-control algorithm are constrained by predetermined set points.

15. A variable voltage dc motor drive for use with a dc electric motor in a fluid flow circuit that maximizes power utilization from an intermittent power source,
said flow circuit comprising at least one sensor configured to obtain a measurement and a fluid prime mover driven by said ac electric motor,
wherein said sensor is one of a flow sensor for measuring a magnitude of a rate of flow in said flow circuit, a pressure sensor for measuring a magnitude of the pressure corresponding to said rate of flow, or a differential pressure sensor for measuring a magnitude of the differential pressure corresponding to said rate of flow,
said variable voltage dc motor drive comprising a controller and circuitry for receiving power from said intermittent power source and providing an output adjustable dc voltage,
wherein said controller comprises an adjustable reference voltage and is in communication with said sensor,
and wherein said controller is configured to maximizes corresponding pumping power utilization from said intermittent power source by maximizing the rate of flow of said fluid through said flow circuit by utilizing a compensation circuit with the measurement from said sensor and implementing a perturb-and-observe control algorithm adapted to iteratively set predetermined values of said reference voltage and said output adjustable dc-voltage of said variable voltage dc motor drive to change the speed of said dc electric motor while monitoring the magnitude of the measurement from said sensor and then incrementally adjusting the predetermined values of the reference voltage and said output adjustable dc-voltage while comparing the measurement from the sensor in order to maximize the rate of flow and the corresponding pumping power utilization.

16. The variable voltage dc motor drive in claim 15, wherein the sensor and the controller communicate using one of electronic, wireless or optical means.

17. The variable voltage dc motor drive in claim 15, wherein said magnitude of the measurement from said sensor and the predetermined values of the reference voltage and said output adjustable dc-voltage of the perturb-and-control algorithm are constrained by predetermined set points.

* * * * *